(No Model.)
J. MURPHY.
APPARATUS FOR THE MANUFACTURE OF INDIA RUBBER HOSE.
No. 323,062. Patented July 28, 1885.
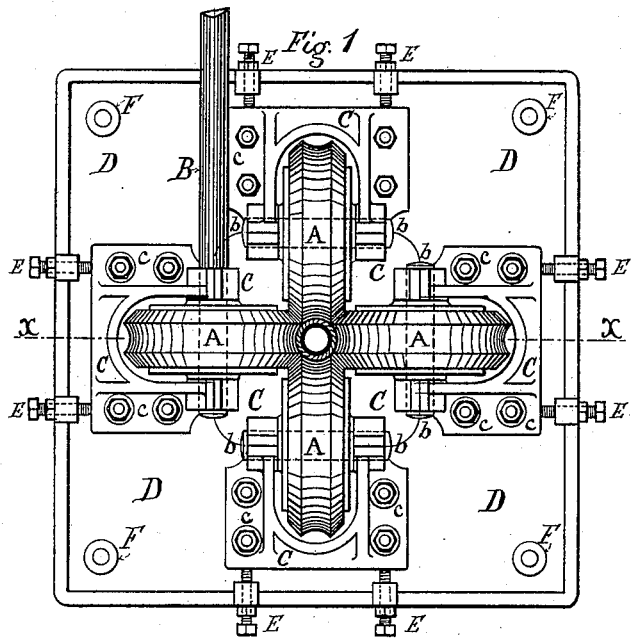
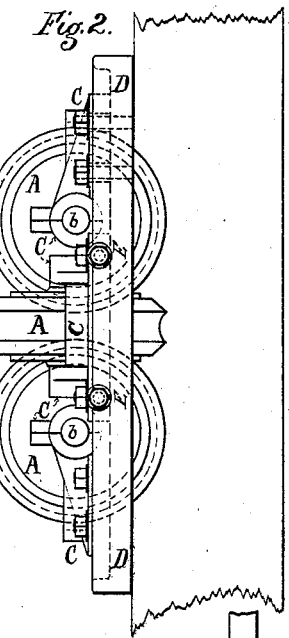
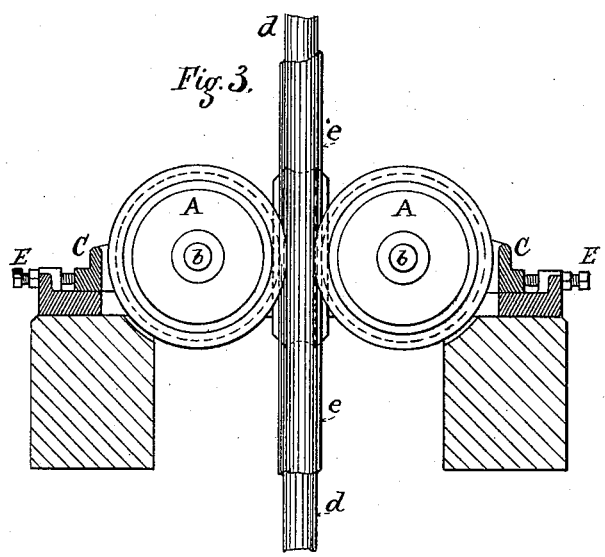
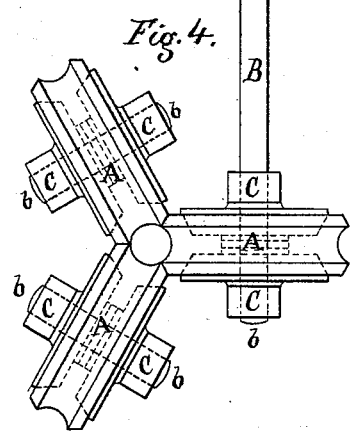
WITNESSES:
L. P. Smith
James Mahony
INVENTOR:
John Murphy
per
Wm. H. Weightman
Atty

UNITED STATES PATENT OFFICE.

JOHN MURPHY, OF BROOKLYN, NEW YORK.

APPARATUS FOR THE MANUFACTURE OF INDIA-RUBBER HOSE.

SPECIFICATION forming part of Letters Patent No. 323,062, dated July 28, 1885.

Application filed April 8, 1885. (No model.)

*To all whom it may concern:*

Be it known that I, JOHN MURPHY, a citizen of the United States, residing in the city of Brooklyn, county of Kings, and State of New York, have invented certain new and useful Improvements in the Manufacture of India-Rubber Hose, of which the following is a specification, reference being had to the accompanying drawings.

My invention relates to apparatus for rolling, compressing, and permanently pressing together the several layers of cloth, of which the hose consists, after they have been wrapped about the mandrel.

In the manufacture of such hose, strips of rubber cloth are cut to a proper width, and, with the end edges overlapping each other and carefully jointed, are wrapped tightly around a mandrel. Such layers, as wrapped about the mandrel, are then permanently pressed to an adhesion of all the layers. Several attempts have been made to effect the pressing to an adhesion, but none have proved effective. Fixed rolls have been tried, adjustable as to size of hose to be made, but none as to effectiveness of pressure or the delivery of any elastic pressure. Hence the present means for effecting such pressing is by the use of a small concave roller attached to a handle, which is rolled, under hand pressure, over the hose the whole length of the mandrel, special attention being given to the location where joint-laps occur. This hand method is at best but a slow process, and there is always an uncertainty as to whether all the parts of the hose have been properly and permanently pressed to an adhesion.

The object of my invention is to overcome the risks of such slow and uncertain hand process, and to develop a machine that will equally and properly press every portion of the hose to a permanent adhesion of all the layers wrapped about the mandrel. I effect this through an increased yet elastic and constant as well as uniform pressure throughout the whole length of hose. I also effect the same with considerable decrease in time occupied. To accomplish this object I locate two or more adjustable elastic rolls, so set and constructed as to form a circular orifice, through which the mandrel, having the strips or sheets wrapped around, is passed, and the several layers of rubber or hose material pressed to a permanent adhesion. I specially construct the rolls of some elastic substance—india-rubber, for instance. These are held in place and up to their work and required pressure upon axles or shafts operating in bearings adjustable to or from the location of the orifice through which the mandrel with wrapped hose is passed. The elastic rolls develop an even and accommodating pressure upon the whole length and circumference of the hose, omitting no portion of the same, resulting in a permanent adhesion of all the several layers forming the hose about the mandrel. The smaller diameters of hose are equally well pressed with those of the slightly-increased diameters at the lap-joints.

In the accompanying drawings, Figure 1 represents a front elevation of a machine or construction embodying my improvements. The machine is fastened to a pair of uprights, and the mandrel, with the contained rubber hose, is drawn through by means of the friction and rotation of the compression-rolls. Such rotation may also be effected by the use of gear-wheels attached directly to each compression-roll. Fig. 2 represents a side view of Fig. 1. Fig. 3 is a cross-section through Fig. 1 on line $x\,x$. Fig. 4 represents a modification showing three compression-rolls.

Similar letters of reference designate like parts in all the figures.

In the operation of this device power is applied through one or more shafts, B, and communicated to the compression-rolls A. In Fig. 1 the power is applied through a single shaft, B, to one of the compression-rolls A, and this one, through friction, revolves the remaining rolls. The compression-wheels are adjusted to wear against each other and to press with greater or less force upon the covered mandrel as it passes through. Such wear of the wheels against each other is regulated to develop friction sufficient to revolve the compression-rolls and draw the wrapped mandrel through in either direction, as may be required. Reversing the travel of compression-rolls reverses the movement of the wrapped mandrel.

In Fig. 3, $d$ represents the mandrel wrapped with several layers of rubber cloth or material, as shown at e, to form the hose construction. The overhanging ends of the strips are snugly pressed to the mandrel and the end entered within the circle or orifice formed by the compressing-rolls. The friction of the compressing-rolls upon the hose materials draws it through and permanently presses the whole to a condition of thorough, permanent, and uniform adhesion.

I do not confine myself to the special construction as shown in the figures of the drawings. Any suitable method of bearing, adjustment, and operation may be used, it merely being provided that the compression-rolls shall be held in place and act in unison upon the circle or circumference of hose to be compressed.

The compression-rolls are represented as held in place and adjusted to position on a bed-plate, D, through or by means of the bearing-boxes C. These boxes are held in place on the bed-plate D by the through-bolts $c\ c\ c$, and are adjusted to position for pressing the compression-rolls A together by the bolts E. Where the power is applied at a single shaft, B, smaller axles $b\ b$ are used for the balance of the compression-rolls. In the usual operation of this device it is fastened to a pair of uprights by bolts at F, directly in line with the wrapping-table, and when wrapped the hose-mandrels are at once passed to and fro through the compressing-rolls. The device may be also used without the application of outside power, by the operator passing, pressing, or pulling the mandrel and its overwrapped material through between the compressing-wheels.

What I claim as new, and desire to secure by Letters Patent, is—

1. A compress for the manufacture of india-rubber hose, provided with two or more adjustable elastic compressing-rolls, having concave surfaces to form an orifice to receive the hose, capable of adjustment as to position, nature, and amount of pressure to be exerted upon the hose while being passed through.

2. In a machine for the manufacture of india-rubber hose, the combination of two or more adjustable elastic compression-rolls, substantially as described, a mandrel about which the hose is wrapped, and means whereby a steady radial pressure is maintained upon the material wrapped about the mandrel while being drawn or passed through the orifice formed by the elastic compression-rolls, substantially as set forth.

3. In a machine for the manufacture of india-rubber hose, the combination of two or more elastic compression-rolls having concave face-surfaces to receive the hose, with a bed-plate to which the several parts or bearings are attached and upon which they are adjusted and operated, substantially as set forth.

4. In a machine for the manufacture of india-rubber hose, the combination of the elastic compression-rolls, each held in place and up to its work between a pair of disks upon a shaft or axle, and adjustable bearings attached to and operated upon a bed-plate, substantially as and for the purposes specified.

5. In a machine for the manufacture of india-rubber hose, the combination of two or more compression-rolls, A A, axles or shafts $b\ b$, adjustable bearings C, and a bed-plate, D, substantially as specified.

6. In a machine for the manufacture of india-rubber hose, the combination of two or more elastic compression-rolls, power shaft or shafts B, axles or shafts $b\ b$, adjustable bearings C, and a bed-plate, D, substantially as and for the purposes specified.

7. In a machine for the manufacture of india-rubber hose, the combination of a bed-plate, D, adjustable bearings C, axles or shafts $b\ b$, driving-shafts B, two or more elastic compression-rolls, A A, and a mandrel upon which the hose material is wrapped and compressed, substantially as and for the purposes specified.

JOHN MURPHY.

Witnesses:
W. J. MORGAN,
LYNDON P. SMITH.